April 6, 1954  A. ARUTUNOFF  2,674,194
COMBINED PROTECTING AND COUPLING UNIT FOR
LIQUID-FILLED SUBMERGIBLE ELECTRIC MOTORS
Filed Feb. 5, 1953  2 Sheets-Sheet 1
FIG. 1.
FIG. 2.
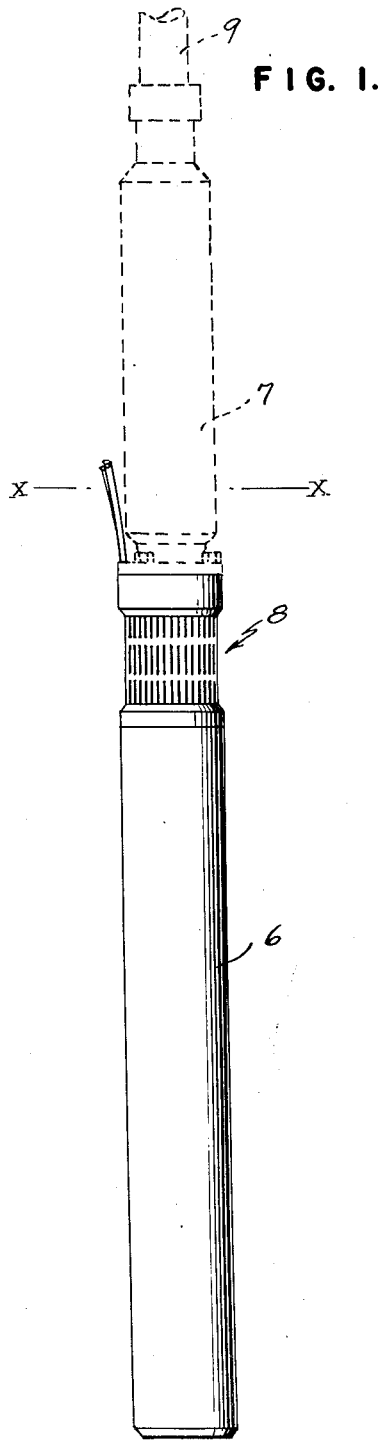
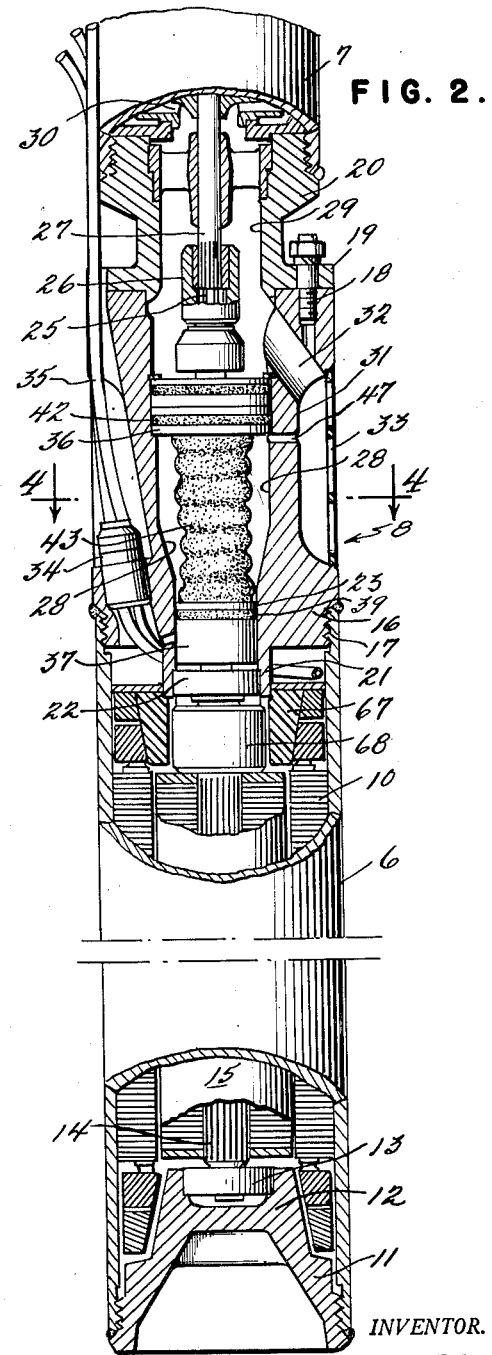
INVENTOR.
ARMAIS ARUTUNOFF
BY
ATTORNEY April 6, 1954

A. ARUTUNOFF 2,674,194

COMBINED PROTECTING AND COUPLING UNIT FOR
LIQUID-FILLED SUBMERGIBLE ELECTRIC MOTORS

Filed Feb. 5, 1953

INVENTOR.
ARMAIS ARUTUNOFF

BY

ATTORNEY

Patented Apr. 6, 1954

2,674,194

UNITED STATES PATENT OFFICE 2,674,194

COMBINED PROTECTING AND COUPLING UNIT FOR LIQUID-FILLED SUBMERGIBLE ELECTRIC MOTORS

Armais Arutunoff, Bartlesville, Okla., assignor to Reda Pump Company, Bartlesville, Okla., a corporation of Delaware Application February 5, 1953, Serial No. 335,308

14 Claims. (Cl. 103—87)

This invention consists in new and useful improvements in a combined protecting and coupling unit for liquid filled submergible electric motors and is primarily directed to an assembly for use in connection with electric motors employed in oil well operations such as the pumping of deep wells, where the motor is disposed in the well, at the lower end of a casing which houses the coaxial pumping and motor protecting unit.

Submergible electric motors are widely used for driving deep well centrifugal pumps and it has become customary to employ an oil-filled lubricating and protecting unit or reservoir generally interposed between the pumping unit and the motor, the lubricating and insulating liquid, filling the motor housing and reservoir. An example of such a construction is illustrated in my former Patent No. 2,569,741, issued October 2, 1951.

That patent discloses an arrangement of one or more collapsible elements disposed in the lubricating reservoir and defining therein, separate pressure zones, respectively subjected to the pressure existing in the reservoir and that the well fluid surrounding the reservoir. The collapsible element or elements are sealed between the respective zones and are responsive to variations in the pressure differential of the lubricating medium in the reservoir and the well fluid surrounding the reservoir, so as to compensate for contraction and expansion of the lubricant resulting from such variations and thus prevent access of the surrounding well fluid to the motor shaft. With the invention contemplated by my former patent, as well as all other generally similar structures with which I am familiar, the insulating and lubricating oil with which the motor housing and the reservoir are filled, is of a conventional type which is lighter than water and a considerably larger volume of liquid, than that contemplated by the present invention, was required for the proper functioning of the motor and adequate protection against intrusion of the surrounding well fluid.

One of the objects of the present invention is to provide a protecting unit adapted to utilize an insulating liquid having a specific gravity greater than that of water such for example, as one of the fluorinated carbon compounds described in the patent to Kauck No. 2,616,927, issued November 4, 1952 and, because of the greater expense involved in the use of this type of compound, my improved motor protector unit is designed to reduce to a minimum the volume of insulating liquid required for a motor of given dimensions.

A further object of the invention is to provide a motor protecting unit which is designed to combine the motor protecting functions in a single unit which serves as the means for connecting the motor to the pump unit, the pump intake, the cable connecting support and the pump-intake screen, thus making it unnecessary for the pump manufacturer to supply these individual parts separately.

Still another object of the invention is to provide a motor protecting unit of extremely simple construction wherein all parts of the protecting mechanism are readily accessible and can be easily installed and removed from outside of the motor casing without dismantling the motor.

A further object of the invention is to provide a protecting element, the parts of which are designed for pre-assembly so that the element can be bodily inserted and removed from the protecting unit.

With the above and other objects in view which will appear as the description proceeds, the invention consists in the novel features herein set forth, illustrated in the accompanying drawings and more particularly pointed out in the appended claims.

Referring to the drawings in which numerals of like character designate similar parts throughout the several views, Figure 1 is a view in side elevation, showing a motor housing with my improved combination protecting unit and pump intake and mounting assembly in place, the pump unit being illustrated in dotted lines.

Figure 2 is an enlarged view of the structure shown in Figure 1 with parts shown in vertical section to illustrate the internal structure of the combined protection and mounting unit.

Figure 3:
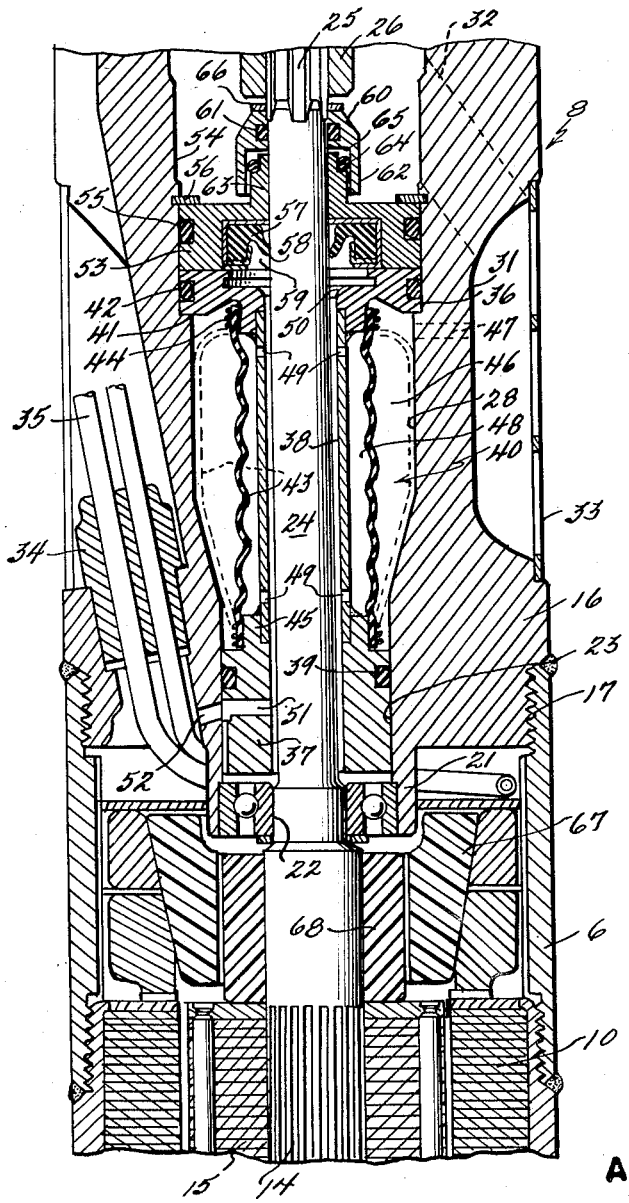
Figure 3 is a vertical sectional view on a much enlarged scale showing the construction of the protecting element which is installed in the protecting unit.
Figure 4:
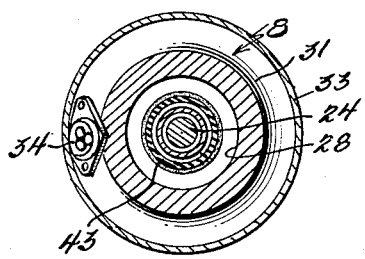
Figure 4 is a transverse sectional view taken on the line 4—4 of Figure 2.

In Figure 1 of the drawings I have shown the general assembly of my improved mechanism wherein the motor housing 6 is coaxially connected to a centrifugal pump casing 7 by means of an intervening mounting and protecting unit generally indicated by the numeral 8. It will be understood that this entire assembly, supported by the discharge pipe 9, is lowered into a well below the water level therein, in the conventional manner, the normal level being indicated at X.

As will be seen from Figure 2, the cylindrical motor housing 6 encloses the usual stator 10 and its lower extremity is closed by bottom 11 which is preferably screw-threaded to engage complementary threads in the end of the motor housing 6. In the construction shown in the drawings, this bottom 11 is provided with an inwardly projecting boss 12 which is coaxially recessed to receive the lower bearing 13 of the vertical rotor shaft 14 of the rotor 15, as hereinafter described more in detail.

The upper end of the motor housing 6 is connected to the lower extremity of the pump housing 7, by the combined protecting and mounting unit 8 which is coaxially interposed between the two units. The intermediate unit 8 consists of an annular base 16 which is reduced and preferably threaded as at 17 to engage complementary threads in the upper end of the motor housing 6, its upper end being vertically drilled at predetermined points to receive studs 18 by means of which the unit is connected to the radial flange 19 of the pump bottom 20.

The bottom of the base 16 of the unit 8 is reduced and shaped to form a depending annular collar 21 adapted to receive suitable bearings 22 for supporting the upper end of the main motor shaft 14, as clearly shown in Figure 3 and a concentric longitudinally extending bore 23 is formed from end to end of the body of unit 8. The upper portion of the motor shaft 14 beyond the upper bearing 22, is reduced as at 24, and extends concentrically through the bore 23, terminating at its upper end in a splined portion 25 for engagement with complementary splines in a coupling member 26, by means of which the shaft extension 24 is operatively connected to the lower splined end of a concentric pump shaft 27 as shown in Figure 2.

The upper portion of the bore 23 of unit 8 is flared and enlarged radially to form an annular chamber 28 which is arranged to communicate at its upper end with the inlet end of the pump bore 29 as will be seen from Figure 2, the bore 29, leading to the inlet side of the lowermost of a series of pump impellers 30, arranged in the pump unit 7. An annular recess 31 is provided on the outer face of the unit 8 and from the upper end of this recess a liquid inlet passageway 32 is directed into the upper end of the enlarged chamber 28. Preferably, a cylindrical screen 33 covers the annular recess 31 to prevent the entrance of foreign matter into the inlet passageway 32 and in turn, into the pump unit.

The annular recess 31 also serves the purpose of accommodating the plug-in connection 34 of the power cable 35 for energizing the motor in housing 6.

Figure 5:
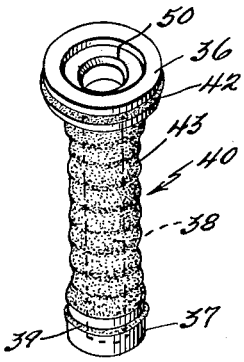
Figure 5 is a detailed perspective view of the protecting element per se.

Turning now to the motor protector element per se, as best illustrated in Figures 3 and 5, a unitary spool-like structure is provided, consisting of an annular head 36 and an annular base member 37 which are maintained in vertically spaced, coaxial relation by means of a central sleeve 38, the read and base being drilled centrally to permit the assembled element to be slipped over the reduced end 24 of the motor shaft 14. The sleeve 38 and the central bores in the head 36 and base 37 have a common inside diameter which affords a suitable clearance with respect to the reduced portion 24 of the shaft, to permit free rotation of the shaft and the entrance of lubricating and protecting fluid around the shaft as will later appear. When assembled, the protecting element, generally indicated by the numeral 40, is inserted in the chamber 28 of the protecting unit 8 and its base 37 is of a diameter to provide a close sliding fit in the bore 23, a sealing ring 39 being arranged in a suitable annular recess in the periphery of the base 37 for sealing engagement with the walls of the bore 23. The head 36 of the element 40 is of a slightly larger diameter than the chamber 28 and rests upon an annular shoulder 41 at the top of the chamber and a similar sealing ring 42 is arranged in a peripheral recess in the head, for sealing engagement with that portion of the bore above the chamber 28.

A collapsible cylinder or breathing member 43 surrounds the central sleeves 38 of the protecting element in radially-spaced relation, being secured at its opposite ends to the head 36 and base 37. Any suitable means may be employed for connecting the cylinder 43 to the head and base, such for example as the opposed cylindrical flanges 44 and 45 formed respectively on the head 36 and base 37. The ends of the cylinder are slipped over these flanges and wrapped with linen thread or the like to afford a sealed connection. Inasmuch as the cylinder 43 is subjected to contact with the lubricating and protecting fluid on one side as well as the surrounding well fluid on the other side, as will hereinafter appear, it must be composed of a flexible material which is not vulnerable to chemical attack by either of these fluids. Various materials are adaptable for this purpose and in the preferred form of my invention, I employ a material such as neoprene which has the desirable properties of flexibility and will withstand chemical attack.

By means of this structure it will be seen that the flexible and collapsible cylinder 43 provides within the chamber 28, an outer annular zone 46 which is in communication with the surrounding well fluid by means of a radial port 47 which opens into the annular recess 31 housed by the protecting screen 33. A second or inner annular zone 48 is bounded by the cylinder 43 and communicates with the interior of the sleeve 38 and the shaft area, by means of radial ports 49 in the sleeve 38.

The upper face of the head 36 is centrally recessed to form a funnel-like cavity 50 by means of which a quantity of lubricating and protecting fluid may be poured into the protecting element and motor housing as hereinafter described. In order to permit the escape of air along the shaft as the motor is being filled, a vent opening 51 is provided in the base member 37 and registers with a similar vent 52 in the wall of the protecting unit 8.

The protecting element 40 is locked in place in the unit 8 and sealed with respect to the shaft extension 24 by means of an annular sealing collar 53 which fits in the upper extension 54 of the bore 23 and rests upon the upper face of the head 36, a sealing ring 55 being provided in the periphery of the collar. A snap ring 56 fits in a suitable recess in the inner wall of the bore extension 54 and locks the collar in place.

The collar 53 is internally sealed with respect to the shaft extension 24 by means of an annular flexible sealing ring 57 located concentrically in a recess provided in the collar 53. The sealing ring 57 is preferably of the type wherein its main body is retained in the collar 53 and provided with a downwardly directed frusto-conical lip 58 which encircles the shaft extension 24 above the funnel-like mouth 50 of the head 36. As will be seen from Figure 3, this arrangement provides a fluid-receiving cavity 59 immediately above the funnel-like mouth 50 and the frusto-conical lip 58 is forced into sealing engagement with the shaft extension with increasing effect, upon an increase in the pressure in the cavity 59, thus preventing the escape of protecting fluid along the shaft extension 24.

As an additional precaution against leakage along the shaft, of the insulating fluid during transportation or storage to the bore extension 54, a sealing cap 60 is slipped over the upper end of the shaft extension 24 and sealed on the shaft by a sealing ring 61. The cap 60 is provided with an annular depending flange or apron 62 which fits over an upward projection or neck 63 formed on the upper face of the collar 53, said neck being reduced at its upper end to receive a sealing ring 64. The apron 62 is radially spaced from the neck 63 below the sealing ring 64 and an annular space 65 is provided above the sealing ring 64 within the upper portion of the cap 60. As will be described later, this arrangement provides an effective seal so that any submergence pressure on the ring 64 is conveyed to the upper side of the ring which is so installed that there is space to move along the sealing surfaces of the shaft in response to outside pressure. The cap 60 is fastened to the shaft extension 24 by means of a spring clip or lock ring 66.

As previously indicated, the motor casing and protecting unit are filled with a heavy insulating liquid which is relatively expensive as compared with the protecting fluids normally used and for this reason it is desirable to reduce the volume of insulating liquid to the minimum required for the intended purposes. To this end, I provide a stationary, frusto-conical, space filler ring 67 in the upper end of the motor casing 6 and a complementary filler collar 68, embracing the motor shaft 14 and arranged concentrically within the ring 67 with a running clearance as best seen in Figure 3. The filler collar 68 may be fastened to the shaft to rotate therewith or it may be simply slipped on the shaft and freely carried thereby. The primary purpose of the ring 67 and collar 68 is to fill the major portion of the space which would otherwise require an added volume of lubricating and insulating liquid, while at the same time affording a sufficient body of such liquid to provide the necessary lubrication and insulation for which the protecting unit is designed.

The ring 67 and collar 68 may be composed of any suitable material such for example, as a plastic material which would not deteriorate upon exposure to the liquid involved.

While a number of insulating liquids of greater specific gravity than water, are available for use in motor protecting units, I have found that fluorocarbons and particularly fluorocarbon corresponding to the formula $(C_4F_9)_3N$, best meets the requirements for protecting the windings of submergible electric motors. A fluorocarbon of this formula has certain specific advantages for this use, namely, it is immiscible with water, its specific gravity is high (1.87), its dielectric strength is very high (1000 v./mil.), its boiling point is high (350° F.), its viscosity is low (2.7 centistokes), it is non-toxic, odorless and colorless. Furthermore, it is one of the most inert and most stable of chemical compounds, decomposing only at 1300° F. and when contacting the commonly encountered liquids in an oil well, it absorbs least of and dissolves least in such liquids.

Another advantage of this compound lies in the fact that the gas bubbles formed when subjected to boiling temperature under a head of water, do not break through the water on reaching up to the water level, but condense back into the original liquid form and it has an excellent heat transfer capacity.

My improved protecting unit is designed to facilitate shipment from the manufacturer in fully-assembled and charged condition so that it may be simply and quickly assembled on the lower end of a pumping unit and lowered into a well. Before shipping from the factory and prior to installing the sealing and locking collar 53, the lubricating and protecting liquid is poured into the funnel-like mouth 50 in the head 36 from whence it runs down along the space surrounding the shaft extension 24 within the zone 48 of protecting element 40, completely filling the motor casing and the collapsible cylinder 43 through the radial openings 49. During this operation the vent openings 51 and 52 permit the escape of air which is displaced along the shaft. The sealing and locking collar 53 is then installed around the shaft extension 24 and pressed firmly down on to the upper face of the head 36, squeezing any surplus liquid into the collapsible cylinder 43, after which the collar is locked in place by the snap ring 56. Additional liquid is then poured around the shaft extension projecting above the collar 53, so as to fill all voids around the shaft and all voids on the upper side of the collar 53. The sealing ring 64 is then slipped over the end of the projecting neck 63 and the locking cap 60 is placed over the neck 63 and the cap is locked in place on the shaft by the snap ring 66.

When in use, upon operation of the electric motor the lubricating and protecting liquid naturally expands to some extent, due to the heat of the motor and as the volume of the liquid increases, the flexible cylinder 43 expands to the necessary extent and may in extreme cases as illustrated in dotted lines in Figure 3 so expand limited only by the walls of the chamber 28, thus practically filling the chamber. When the motor is stopped the liquid contracts and reduces in volume and the surrounding well fluid enters the chamber 28 through the radial port 47, collapsing the cylinder 43 as shown in full lines in Figure 3. However, the motor shaft extension 24 is completely sealed against the entrance of the surrounding well fluid as will be apparent from the structure previously described. When the motor starts again, the expansion of the protecting liquid simply expands the cylinder 43 and forces the well fluid which has entered the chamber 28, back through the port 47 into the well.

It will thus be seen that with my improved design I have effected a far superior utilization of material, better protection of the motor by the use of a heavy insulating liquid, and by combining the functions of the motor protecting unit with those of the pump intake and coupling members, I have provided a greatly simplified construction in a self-contained motor protector and coupling unit.

From the foregoing it is believed that my invention may be readily understood by those skilled in the art without further description, it being borne in mind that numerous changes may be made in the details of construction without de-

I claim:

1. The combination with an oil-filled electric motor unit and a pump unit located concentrically above the same and adapted to be submerged therewith in a surrounding well fluid, each unit including a casing and main shaft and the inlet end of said pump unit being located concentrically at the lower end of its casing; of a combined coupling, motor protecting and pump inlet assembly comprising an annular body interposed between said units, means at the opposite ends of said body for connecting the same to the adjacent ends of respective casings, a coaxial cavity in said body, communicating at opposite ends with the pump inlet and motor casing, a motor shaft extension projecting longitudinally through said cavity, means for coupling said extension to said pump shaft, a transverse partition in said cavity, sealed with respect to the shaft extension and cavity walls and defining an upper inlet chamber leading to the pump inlet and a lower breathing chamber, a protecting element in said breathing chamber, including a collapsible cylinder surrounding said shaft extension in spaced relation and sealed at its opposite ends to the walls of said cavity, said cylinder defining in said breathing chamber, an inner liquid reservoir, surrounding the shaft extension and communicating with said motor casing and an outer annular breathing zone communicating with the surrounding well fluid through an opening in the wall of said cavity, means for introducing a protecting liquid in said reservoir, and an inlet passageway through said annular body, placing said inlet chamber in communication with the surrounding well fluid.

2. The combination with an oil filled electric motor unit and a pump unit located concentrically above the same and adapted to be submerged therewith in a surrounding well fluid, each unit including a casing and main shaft and the inlet end of said pump unit being located concentrically at the lower end of its casing; of a combined coupling, motor protecting and pump inlet assembly comprising an annular body interposed between said units, means at the opposite ends of said body for connecting the same to the adjacent ends of respective casings, a central bore extending longitudinally through said body and enlarged at its upper end to form an annular cavity which opens into the inlet end of said pump, a radial opening in said body placing said cavity in communication with the surrounding well fluid, a motor shaft extension rotatably supported in said bore and extending centrally through said cavity, said shaft extension having means at its upper end for connection to said pump shaft, a motor protecting element comprising head and base members concentrically connected by an intervening sleeve, said head base and sleeve being spaced around said shaft extension, a closure collar sealed around said shaft extension and to the walls of said cavity, dividing the latter into a lower closed protecting chamber and an upper inlet chamber opening into the pump unit, a collapsible cylinder surrounding said sleeve in spaced relation and sealed at its opposite ends of said head and base, said cylinder defining in said protecting chamber a liquid reservoir surrounding the shaft extension and communicating with said motor casing and a concentric outer breathing zone communicating with the surrounding well fluid through an opening in the wall of said protecting chamber, the upper end of said reservoir being closed by said closure collar, means for introducing a protecting liquid in said reservoir and an inlet passageway through said annular body, placing said inlet chamber in communication with the surrounding well fluid.

3. The combination as claimed in claim 1, wherein the collapsible cylinder of said protecting element is supported at opposite ends by annular head and base members spaced from said shaft extension, and means sealing the peripheries of said members with respect to the walls of said breathing chamber.

4. The combination as claimed in claim 3, including means in said head for filling said reservoir.

5. The combination as claimed in claim 3, wherein said head is provided with a funnel-shaped mouth surrounding said shaft extension in spaced relation, to provide a filler opening for said reservoir.

6. Apparatus as claimed in claim 3, said expandable container and said seal arranged and disposed to prevent loss of insulating liquid during transportation or storage as well as for prevention of entrance of air, moisture or water.

7. A motor protecting and coupling unit adapted to be interposed between coaxial motor and pump units, each of the latter including a casing and main shaft, said protecting and coupling unit comprising an annular body, means at the opposite ends thereof for connecting the same to the adjacent ends of the motor and pump units, a central bore extending longitudinally through said body, enlarged toward its upper end to form a breathing chamber, bearing means supported in the lower end of said bore for rotatably mounting said motor shaft, a motor shaft extension projecting longitudinally through said bore and chamber, means for coupling said extension to said pump shaft, a transverse partition in the upper portion of said chamber, sealed with respect to the shaft extension and chamber walls and defining an upper inlet compartment leading to the pump inlet and a lower breathing compartment, a protecting element in said breathing compartment, including a collapsible cylinder surrounding said shaft extension in spaced relation and sealed at its opposite ends to the walls of said breathing compartment, said cylinder defining in said breathing compartment, an inner liquid reservoir, surrounding the shaft extension and communicating with said motor casing and an outer annular breathing zone communicating with the surrounding well fluid through an opening in the wall of said breathing compartment, means for introducing a protecting liquid in said reservoir, and an inlet passageway through said annular body, placing said inlet chamber in communication with the surrounding well fluid.

8. Apparatus as claimed in claim 7, wherein said body is provided with a peripheral recess embracing the inlet ends of said inlet passageway and breathing chamber inlet and a protecting screen surrounding said recess.

9. A protecting unit for oil-filled submergible electric motors, comprising an annular body adapted to be interposed between an electric motor and a superimposed, coaxial pump, a central bore extending longitudinally through said body and being enlarged toward its upper end to form a chamber, a motor shaft extension projecting through said bore and chamber for connecting the motor shaft to the pump shaft, a protecting element removably insertible in said chamber, comprising a head member and base member, connected and axially spaced by a concentric sleeve member, said members surrounding said shaft extension in spaced relation to provide an annular liquid passageway along the shaft extension, communicating with the interior of the motor, a collapsible cylinder surrounding said sleeve in spaced relation, with its opposite ends sealed to said head and base to form in said chamber, an inner liquid reservoir and an outer annular breathing zone, said reservoir communicating with said annular passageway through an opening in said sleeve and said breathing zone communicating with the surrounding well fluid through an opening in the wall of said chamber, a closure collar in sealing engagement with said shaft extension and chamber walls, closing the chamber above said head and forming the bottom of a pump inlet compartment in the upper end of said chamber, said compartment opening into the inlet end of said pump, and an inlet opening to said compartment for receiving the fluid being pumped.

10. A motor protector unit as claimed in claim 9, wherein said body is peripherally recessed to form an annular feeding channel, communicating with the inlet opening to said compartment and the opening in the wall of said chamber, and a protecting screen around said channel.

11. In a submergible pumping assembly, the combination with a pump unit and a coaxial motor unit suspended therefrom with concentric shafts in respective units; of a combined coupling, motor-protecting and pump inlet unit interposed between said first named units, comprising a body, means at opposite ends thereof for connecting said body to the respective ends of said pump unit and motor unit, a central cavity in said body, a motor shaft extension projecting through said cavity and connecting said pump and motor shafts, a motor protecting element in said cavity including a collapsible cylinder surrounding said shaft extension, in spaced relation and sealed to the walls of said cavity, to form therein a protecting liquid reservoir around the shaft and communicating with the moter unit, and a sealed-off breathing zone communicating with the exterior of the body, means in said cavity above said element, sealed with respect to the cavity walls and shaft, forming in said cavity a pump inlet compartment, and an inlet passageway in said body leading to said compartment.

12. An assembly as claimed in claim 11, including a body of liquid filling said reservoir and motor unit and having a greater specific gravity than water.

13. An assembly as claimed in claim 12, including supplemental space-filling means in the motor unit to minimize the quantity of protecting liquid required.

14. A combined coupling, motor protecting and pump inlet unit for a motor unit and a superimposed, coaxial pump unit, comprising a body adapted to be interposed between said last named units, a central cavity in said body, a motor-pump coupling shaft in said cavity, a partition dividing said cavity into a pump inlet compartment and a protecting chamber, an inlet passageway to said compartment and a collapsible breather element in said chamber, sealed around said shaft to define in said chamber, a reservoir for protecting liquid and an outer breathing zone communicating with the area around said body.

References Cited in the file of this patent

UNITED STATES PATENTS

| Number | Name | Date |
|---|---|---|
| 2,309,707 | Myers | Feb. 2, 1943 |
| 2,354,874 | Myers | Aug. 1, 1944 |
| 2,492,141 | Gaylord | Dec. 27, 1949 |
| 2,569,741 | Arutunoff | Oct. 2, 1951 |